United States Patent Office 3,346,493
Patented Oct. 10, 1967

3,346,493
LUBRICANTS CONTAINING METAL COMPLEXES OF ALKENYL SUCCINIC ACID-AMINE REACTION PRODUCTS
William M. Le Suer, Cleveland, Ohio, assignor to The Lubrizol Corporation, Wickliffe, Ohio, a corporation of Ohio
No Drawing. Original application Dec. 26, 1963, Ser. No. 333,616, now Patent No. 3,306,908, dated Feb. 28, 1967. Divided and this application Aug. 1, 1966, Ser. No. 569,078
12 Claims. (Cl. 252—32.5)

ABSTRACT OF THE DISCLOSURE

Lubricant compositions containing (1) a lubricating oil and (2) a minor proportion of a metal complex of the reaction products of hydrocarbon-substituted succinic acid compounds and alkylene amines, the complexes being formed by reactiig at least about 0.1 equivalent of a complex-forming metal compound with the reaction products. Typical complexes include tin and zinc complexes of the reaction products of polyisobutene-substituted anhydride and polyalkylene polyamines.

---

This application is a division of Ser. No. 333,616, filed Dec. 26, 1963, now U.S. Patent 3,306,908.

This invention relates to metal-containing compositions and to the process of preparing the same. The compositions of this invention are useful as plasticizers, paint additives, lubricants, and additives in lubricants and hydrocarbons.

Metal-containing compositions that are stable under oxidative and hydrolytic conditions are desirable for many purposes. The metal-containing compositions that are compatible with organic substances and soluble in liquid carriers such as hydrocarbons, fuel, lubricating oils are especially desirable for use as additives in compositions such as paints, lubricants, rust-proofing compositions, etc.

It is accordingly an object of this invention to provide novel compositions of matter.

It is also an object of this invention to provide compositions useful as additives in hydrocarbons.

It is also an object of this invention to provide compositions useful as additives in lubricants.

It is another object of this invention to provide compositions effective as detergents.

It is further an object of this invention to provide lubricating compositions.

These and other objects are achieved in accordance with this invention by providing a process for preparing metal complexes comprising forming a non-acidic, acylated nitrogen intermediate by the reaction of a hydrocarbon-substituted succinic acid compound having at least 50 aliphatic carbon atoms in the hydrocarbon substituent with at least about 1 equivalent of an alkylene amine and reacting said acylated nitrogen intermediate with at least about 0.1 equivalent of a complex-forming metal compound selected from the class consisting of nitrates, nitrites, halides, carboxylates, phosphates, phosphites, sulfates, sulfites, carbonates, borates, and oxides of cadmium, tin, and metals having atomic numbers from 24 to 30.

The hydrocarbon substituent of the non-acidic, acylated nitrogen intermediate may contain polar groups provided, however, that the polar groups are not present in proportions sufficiently large to alter significantly the hydrocarbon character of the substituent. The polar groups are exemplified by chloro, bromo, keto, ethereal, aldehydo, and nitro, etc. The upper limit with respect to the proportion of such polar groups in the substituent is approximately 10% based on the weight of the hydrocarbon portion of the substituent.

The sources of the hydrocarbon substituent include principally the high molecular weight substantially saturated petroleum fractions and substantially saturated olefin polymers, particularly polymers of mono-olefins having from 2 to 30 carbon atoms. The especially useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. They are illustrated by 2-butene, 3-pentene, and 4-octene.

Also useful are the interpolymers of olefins such as those illustrated above with other interpolymerizable olefinic substances such as aromatic olefins, cyclic olefins, and polyolefins. Such interpolymers include, for example, those prepared by polymerizing isobutene with styrene; isobutene with butadiene; propene with isoprene; ethylene with piperylene; isobutene with chloroprene; isobutene with p-methyl styrene; 1-hexene with 1,3-hexadiene; 1-octene with 1-hexene; 1-heptene with 1-pentene; 3-methyl-1-butene with 1-octene; 3,3-dimethyl-1-pentene with 1-hexene; iso butene with styrene and piperylene; etc.

The relative proportions of the monoolefins to the other monomers in the interpolymers influence the stability and oil-solubility of the final products derived from such interpolymers. Thus, for reasons of oil-solubility and stability the interpolymers contemplated for use in this invention should be substantially aliphatic and substantially saturated, i.e., they should contain at least about 80%, preferably at least about 95% on a weight basis of units derived from the aliphatic mono-olefins and no more than about 5% of olefinic linkages based on the total number of carbon-to-carbon covalent linkages. In most instances, the percentage of olefinic linkages should be less than about 2% of the total number of carbon-to-carbon covalent linkages.

Specific examples of such interpolymers include the copolymer of 95% (by weight) of isobutene with 5% of styrene; the terpolymer of 98% of isobutene with 1% of piperylene and 1% of chloroprene; the terpolymer of 95% is isobutene with 2% of 1-butene and 3% of 1-hexene; the terpolymer of 80% of isobutene with 20% of 1-pentene and 20% of 1-octene; the copolymer of 80% of 1-hexene and 20% of 1-heptene; the terpolymer of 90% of isobutene with 2% of cyclohexene and 8% of propene; and the copolymer of 80% of ethylene and 20% of propene.

Another source of the hydrocarbon radical comprises saturated aliphatic hydrocarbons such as highly refined high molecular weight white oils or synthetic alkanes such as are obtained by hydrogenation of high molecular weight olefin polymers illustrated above or high molecular weight olefinic substances.

The use of olefin polymers having molecular weight of about 750–5000 is preferred. Higher molecular weight olefin polymers having molecular weights from about 10,000 to about 100,000 or higher have been found to impart also viscosity index improving properties to the final products of this invention. The use of such higher molecular weight olefin polymers often is desirable.

The alkylene amines from which the non-acidic acylated nitrogen intermediate is derived, conform for the most part to the formula

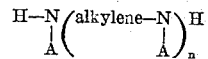

wherein $n$ is an integer preferably less than about 10, A is a hydrocarbon or hydrogen radical, and the alkylene radical is preferably a lower alkylene radical having less than about 8 carbon atoms. The alkylene amines include principally methylene amines, ethylene amines, butylene amines, propylene amines, pentylene amines, hexylene amines, heptylene amines, octylene amines, other polymethylene amines, and also the cyclic and the higher homologues of such amines such as piperazines and aminoalkyl-substituted piperazines. They are exemplified specifically by: ethylene diamine, triethylene tetramine, propylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 4-methylimidazoline, 1,3-bis(2-aminoethyl)imidazoline, 1-(2 - aminopropyl)piperazine, 1,4-bis(2-aminoethyl)piperazine, and 2-methyl-1-(2-aminobutyl)piperazine. Higher homologues such as are obtained by condensing two or more of the above-illustrated alkylene amines likewise are useful.

The ethylene amines are especially useful. They are described in some detail under the heading "Ethylene Amines" in "Encyclopedia of Chemical Technology" Kirk and Othmer, volume 5, pages 898–905, Interscience Publishers, New York (1950). Such compounds are prepared most conveniently by the reaction of an alkylene chloride with ammonia. The reaction results in the production of somewhat complex mixtures of alkylene amines, including cyclic condensation products such as piperazines. These mixtures find use in the process of this invention. On the other hand, quite satisfactory products may be obtained also by the use of pure alkylene amines. An especially useful alkylene amine for reasons of economy as well as effectiveness of the products derived therefrom is a mixture of ethylene amines prepared by the reaction of ethylene chloride and ammonia and having a composition which corresponds to that of tetraethylene pentamine.

Hydroxyalkyl-substituted alkylene amines, i.e., alkylene amines having one or more hydroxyalkyl substituents on the nitrogen atoms, likewise are contemplated for use herein. The hydroxyalkyl-substituted alkylene amines are preferably those in which the alkyl group is a lower alkyl group, i.e., having less than about 6 carbon atoms. Examples of such amines include N-(2-hydroxyethyl)ethylene diamine, N,N'-bis(2-hydroxyethyl)ethylene diamine, 1-(2-hydroxyethyl)piperazine, mono-hydroxypropyl-substituted diethylene triamine, 1,4-bis(2-hydroxypropyl)piperazine, dihydroxypropyl-substituted tetraethylene pentamine, N-(3-hydroxypropyl)tetramethylene diamine, and 2-heptadecyl-1-(2-hydroxyethyl)imidazoline.

Higher homologues such as are obtained by condensation of the above-illustrated alkylene amines or hydroxy alkyl-substituted alkylene amines through amino radicals or through hydroxy radicals are likewise useful. It will be appreciated that condensation through amino radicals results in a higher amine accompanied with removal of ammonia and that condensation through the hydroxy radicals results in products containing ether linkages accompanied with removal of water.

The non-acidic acylated nitrogen intermediate of this invention is characterized by a nitrogen atom attached directly to the succinic radical. It will be appreciated, of course, that the linkage between a nitrogen atom and a succinic radical may be representative of an amide, imide, amidine, or ammonium-carboxylic acid salt structure. Thus, the non-acidic, acylated nitrogen compositions of this invention are characterized by amide, amide-salt, imide, amidine, or salt linkages and in many instances a mixture of such linkages.

A convenient method for preparing the acylated nitrogen intermediate comprises reacting a high molecular weight succinic acid compound characterized by the presence within its structure of a high molecular weight group having at least about 50 aliphatic carbon atoms and at least one succinic acid-producing group. Such compounds are illustrated by the structural configuration

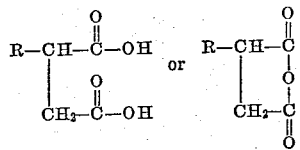

wherein R is a substantially hydrocarbon radical having at least about 50 aliphatic carbon atoms.

The reaction between the succinic acid compound with the alkylene amine results in the direct attachment of the nitrogen atoms to the succinic radical. As indicated previously, the linkage formed between the nitrogen atom and the succinic radical may thus be that representative of a salt, amide, imide, or amidine radical. In most instances the acylated nitrogen intermediate contains a mixture of linkages representative of such radicals. The precise relative proportions of such radicals in the intermediate usually are not known as they depend to a large measure upon the reactants used and also upon the environment (e.g., temperature) in which the reaction is carried out. To illustrate, the reaction involving an acid or anhydride group with an amino nitrogen-containing radical at relatively low temperatures such as below about 60° C. results predominantly in a salt linkage, i.e.,

but at relative high temperatures such as above about 80° C. results predominantly in an amide, imide, or amidine linkage, i.e.,

In any event, however, the intermediate obtained by the above reaction, irrespective of the nature or relative proportions of the linkages present therein, must be substantially non-acidic, i.e., having an acid number less than 10 as measured by titration with phenolphthalein as the indicator. The succinic acids or anhydrides are readily available from the reaction of maleic anhydride with a high molecular weight olefin or a chlorinated hydrocarbon such as the olefin polymer described hereinabove. The reaction involves merely heating the two reactants at a temperature about 100°–200° C. The product from such a reaction is an alkenyl succinic anhydride. The alkenyl group may be hydrogenated to an alkyl group. The anhydride may be hydrolyzed by treatment with water or steam to the corresponding acid.

In lieu of the olefins or chlorinated hydrocarbons, other hydrocarbons containing an activating polar substituent, i.e., a substituent which is capable of activating the hydrocarbon molecule in respect to reaction with maleic acid or anhydride, may be used in the above-illustrated reaction for preparing the succinic compounds. Such polar substituents may be illustrated by sulfide, disulfide, nitro, mercaptan, bromine, ketone, or aldehyde radicals. Examples of such polar-substituted hydrocarbons include polypropene sulfide, di-polyisobutene disulfide, nitrated mineral oil, di-polyethylene sulfide, brominated polyethylene, etc. Another method useful for preparing the succinic acids and anhydrides involves the reaction of itaconic acid with a high molecular weight olefin or a polar-substituted hydrocarbon at a temperature usually within the range from about 100° C. to about 200° C.

The reaction by which the non-acidic nitrogen intermediate is formed is usually carried out by heating a mixture of the succinic acid compound and the alkylene amine at a temperature above about 80° C., preferably within the range from about 100° C. to about 250° C. However, the process may be carried out at a lower temperature such as room temperature to obtain products having predominantly salt linkages or mixed salt-amide linkages. Such products may be converted, if desired, by heating to above 80° C. to products having predominantly amide, imide, or amidine linkages. The use of a solvent such as benzene, toluene, naphtha, mineral oil, xylene, n-hexane, or the like is often desirable in the above process to facilitate the control of the reaction temperature.

The relative proportions of the succinic acid compound and the alkylene amine reactants to be used in the above process are such that at least about a stoichiometrically equivalent amount of the alkylene amine reactant is used for each equivalent of the succinic acid compound used. In this regard it will be noted that the equivalent weight of the alkylene amine is based upon the number of the nitrogen-containing radicals. Similarly the equivalent weight of the succinic acid is based upon the number of the carboxylic acid radicals present in its molecular structure. Thus, ethylene diamine has two equivalents per mole; triethylene tetramine has four equivalents per mole; a mono-succinic acid (or anhydride) has two equivalents per mole, etc.

The upper limit of the useful amount of the alkylene amine reactant appears to be about two moles for each equivalent of the succinic acid compound used. Such amount is required, for instance, in the formation of products having predominantly amidine linkages. On the other hand, the lower limit of about one equivalent of the alkylene amine reactant used for each equivalent of the succinic acid compound is based upon the stoichiometry for the formation of products having predominantly amide linkages or mixed acid-amide linkages. In most instances, the preferred amount of the alkylene amine reactant is from about 1.1 to 5 equivalent, for each equivalent of the succinic acid compound used.

The following examples illustrate the processes useful for preparing the non-acidic acylated nitrogen intermediates useful in the process of this invention:

*Example 1*

A polyisobutenyl succinic anhydride is prepared by the reaction of a chlorinated polyisobutylene with maleic anhydride at 200° C. The polyisobutenyl radical has an average molecular weight of 850 and the resulting alkenyl succinic anhydride is found to have an acid number of 113 (corresponding to an equivalent weight of 500). To a mixture of 500 grams (1 equivalent) of this polyisobutenyl succinic anhydride and 160 grams of toluene there is added at room temperature 35 grams (1 equivalent) of diethylene triamine. The addition is made portionwise throughout a period of 15 minutes, and an initial exothermic reaction caused the temperature to rise to 50° C. The mixture then is heated and a water-toluene azeotrope distilled from the mixture. When no more water would distill the mixture is heated to 150° C. at reduced pressure to remove the toluene. The residue is diluted with 350 grams of mineral oil and this solution is found to have a nitrogen content of 1.6%.

*Example 2*

The procedure of Example 1 is repeated using 30 grams (1 equivalent) of ethylene diamine as the amine reactant. The nitrogen content of the resulting product is 1.4%.

*Example 3*

The procedure of Example 1 is repeated using 55.5 grams (1.5 equivalents) of an ethylene amine mixture having a composition corresponding to that of triethylene tetramine. The resulting product has a nitrogen content of 1.9%.

*Example 4*

The procedure of Example 1 is repeated using 55.0 grams (1.5 equivalent) of triethylene tetramine as the amine reactant. The resulting product has a nitrogen content of 2.9%.

*Example 5*

To a mixture of 140 grams of toluene and 400 grams (0.78 equivalent) of a polyisobutenyl succinic anhydride (having an acid number of 109 and prepared from maleic anhydride and the chlorinated polyisobutylene of Example 1) there is added at room temperature 63.6 grams (1.55 equivalents) of a commercial ethylene amine mixture having an average composition corresponding to that of tetraethylene pentamine. The mixture is heated to distill the water-toluene azeotrope and then to 150° C. at reduced pressure to remove the remaining toluene. The residual polyamide has a nitrogen content of 4.7%.

*Example 6*

The procedure of Example 1 is repeated using 46 grams (1.5 equivalents) of ethylene diamine as the amine reactant. The product which resulted has a nitrogen content of 1.5%.

*Example 7*

A polyisobutenyl succinic anhydride having an acid number of 105 and an equivalent weight of 540 is prepared by the reaction of a chlorinated polyisobutylene (having an average molecular weight of 1,050 and a chlorine content of 4.3%) and maleic anhydride. To a mixture of 300 parts by weight of the polyisobutenyl succinic anhydride and 160 parts by weight of mineral oil there is added at 65–95° C. an equivalent amount (25 parts by weight) of the commercial ethylene amine mixture of Example 5. This mixture then is heated to 150° C. to distill all of the water formed in the reaction. Nitrogen is bubbled through the mixture at this temperature to insure removal of the last traces of water. The residue is diluted by 79 parts by weight of mineral oil and this oil solution found to have a nitrogen content of 1.6%.

*Example 8*

A mixture of 2,112 grams (3.9 equivalents) of the polyisobutenyl succinic anhydride of Example 7, 136 grams (3.9 equivalents) of diethylene triamine, and 1060 grams of mineral oil is heated at 140–150° C. for one hour. Nitrogen is bubbled through the mixture at this temperature for four more hours to aid in the removal of water. The residue is diluted with 420 grams of mineral oil and this oil solution is found to have a nitrogen content of 1.3%.

*Example 9*

To a solution of 1,000 grams (1.87 equivalents) of the polyisobutenyl succinic anhydride of Example 7, in 500 grams of mineral oil there is added at 85–95° C., 70 grams (1.87 equivalents) of tetraethylene pentamine. The mixture then is heated at 150°–165° C. for four hours, blowing with nitrogen to aid in the removal of water. The residue is diluted with 200 grams of mineral oil and the oil solution found to have a nitrogen content of 1.4%.

*Example 10*

A polypropenyl succinic anhydride is prepared by the reaction of a chlorinated polypropylene (having a molecular weight of about 900 and a chlorine content of 4%) and maleic anhydride at 200° C. The product has an acid number of 75. To a mixture of 390 grams (0.52 equivalent) of this polypropenyl succinic anhydride, 500 grams of toluene, and 170 grams of mineral oil there is added portionwise 22 grams (0.52 equivalent) the commercial ethylene amine mixture of Example 5. The reaction mixture is heated at reflux temperature for three hours and water removed from an azeotrope with toluene. The toluene then is removed by heating to 150° C./20 millimeters. The residue was found to contain 1.3% of nitrogen.

*Example 11*

A substituted succinic anhydride is prepared by reacting maleic anhydride with a chlorinated copolymer of isobutylene and styrene. The copolymer consists of 94 parts by weight of isobutylene units and 6 parts by weight of styrene units, has an average molecular weight of 1,200, and is chlorinated to a chlorine content of 2.8% by weight. The resulting substituted succinic anhydride has an acid number of 40. To 710 grams (0.51 equivalent) of this substituted succinic anhydride and 500 grams of toluene there is added portionwise 22 grams (0.51 equivalent) of the commercial ethylene amine mixture of Example 5. The mixture is heated at reflux temperature for three hours to remove by azeotropic distillation all of the water formed in the reaction, and then at 150° C./20 millimeters to remove the toluene. The residue contains 1.1% by weight of nitrogen.

Example 12

A substituted succinic anhydride is prepared by reacting maleic anhydride with a chlorinated copolymer of isobutylene and isoprene. The copolymer consists of 99 parts by weight of isobutylene units and 1% by weight of isoprene units. The molecular weight of the copolymer is 28,000 and the chlorine content of the chlorinated copolymer is 1.95%. The resulting alkenyl succinic anhydride had an acid number of 54. A mixture of 228 grams (0.22 equivalent) of an oil solution of this alkenyl succinic anhydride, 58 grams of additional mineral oil, 500 grams of toluene, and 9.3 grams (0.22 equivalent) of the commercial ethylene amine mixture of Example 5 is heated at 110°–120° C. for three hours, water being removed from an azeotrope with toluene. When all of the water has thus been removed the toluene is distilled by heating to 150° C./20 millimeters. The residue is found to have a nitrogen content of 1.1%.

Example 13

A polyisobutenyl succinic anhydride is prepared by the reaction of a chlorinated polyisobutylene with maleic anhydride. The chlorinated polyisobutylene has a chlorine content of 2% and an average molecular weight of 11,000. The polyisobutenyl succinic anhydride has an acid number of 4.8. A mixture of 410 grams (0.35 equivalent) of this anhydride, 15 grams (0.35 equivalent) of the commercial ethylene amine mixture of Example 5 and 500 grams of toluene is heated at reflux temperature for four hours to remove water from an azeotrope with toluene. The toluene then is removed by heating to 150° C./20 millimeters. The nitrogen content of the residue is 1.3%.

Example 14

The procedure of Example 5 is repeated except that 0.94 equivalent of the amine is used instead of 1.55 equivalents. The nitrogen content of the product is 3%.

Example 15

A polyisobutenyl-substituted succinic acid is prepared by hydrolysis of the corresponding anhydride (prepared in turn by the condensation of a chlorinated polyisobutylene and maleic anhydride). To 1152 grams (1.5 equivalents) of a 70% mineral oil solution of this polyisobutenyl succinic acid having an acid number of 62 there is added at room temperature 59.5 grams (1.5 equivalents) of the commercial ethylene amine mixture of Example 5. This mixture is heated at 150°–167° C. for 7 hours during which time a total of 19.5 grams of water is distilled from the mixture. The residue is diluted with 174 grams of mineral oil and then filtered at 150° C. The filtrate has a nitrogen content of 1.6%.

Example 16

A mixture of 1,056 grams (2.0 equivalents) of the polyisobutenyl succinic anhydride of the preceding example (in which the polyisobutenyl group has a molecular weight of 850), 89 grams (2.0 equivalents) of di-(1,2-propylene)-triamine (having a nitrogen content of 31.3%), 370 grams of mineral oil and 100 grams of toluene is heated at reflux temperature (180°–190° C.) for 5 hours. A total of 18 grams of water is collected from the water-toluene azeotrope. The residue is heated to 150° C./20 mm. to remove any last traces of water which might have remained. The nitrogen analysis of this residue is 1.9%.

Example 17

A polyisobutylene having an average molecular weight of 50,000 is chlorinated to a chlorine content of 10% by weight. This chlorinated polyisobutylene is reacted with maleic anhydride to produce the corresponding polyisobutenyl succinic anhydride having an acid number of 24. To 6,000 grams (2.55 equivalents) of this anhydride there is added portionwise at 70–105° C. 108 grams (2.55 equivalents) of the commercial ethylene amine mixture of Example 5 over a period of 45 minutes. The resulting mixture is heated for four hours at 160–180° C. while nitrogen is bubbled throughout to remove water. When all of the water has been removed the product is filtered and the filtrate found to have a nitrogen content of 0.6%.

Example 18

A mixture of 1 equivalent of a polyisobutene-substituted succinic anhydride having an acid number of 98 (prepared according to the procedure described in Example 1) and 1 equivalent of an acrolein-ammonia (molar ratio of 1:1) interpolymer having a nitrogen content of 23% by weight is diluted with 40% by its weight of a mineral oil. The resulting mixture is heated to 155° C. and nitrogen is bubbled through the mixture at this temperature for 5 hours. The residue is found to have a nitrogen content of 1.35%.

Example 19

A cyanoethyl-substituted ethylene amine is prepared by mixing 212 grams of acrylonitrile with 216 grams of an ethylene amine mixture consisting of 75% by weight of triethylene tetramine and 25% by weight of diethylene triamine at room temperature and heating the mixture at 110°–130° C. for 5 hours and then to 125° C./30 mm. To a mixture of 1,110 grams of the polyisobutene-substituted succinic anhydride of Example 1 and 825 grams of mineral oil there is added at 60° C., 143 grams dropwise of the above cyanoethyl-substituted ethylene amine (having a nitrogen content of 31.8%). The mixture is heated at 150°–160° C. for 5 hours while being purged with nitrogen. A total of 6 cc. of water is removed by distillation. The residue has a nitrogen content of 1.66%.

Example 20

To a mixture of 430 grams of the polyisobutene-substituted succinic anhydride of Example 1 and 355 grams of mineral oil there is added at 60°–80° C. 108 grams of N-aminopropyl morpholine throughout a period of 1 hour. The mixture is heated at 150°–155° C. for 5 hours. The residue is found to have a nitrogen content of 2.3%.

Example 21

To a mixture of 430 grams of the polyisobutene-substituted succinic anhydride of Example 1 and 304 grams of mineral oil there is added at 60°–80° C. 33 grams of dipropylene triamine. The mixture is then heated at 150°–155° C. for 5 hours until no more water distills. The residue is found to have a nitrogen content of 1.45%.

Example 22

A diisobutenyl-substituted ethylene amine is prepared by reacting 590 grams of diisobutenyl chloride and 264 grams of a mixture consisting of 75% by weight of triethylene tetramine and 20% by weight of diethylene triamine in the presence of 264 grams of potassium hydroxide (85% purity) and 2,200 grams of isopropyl alcohol at 85°–90° C. A mixture of 528 grams of polyisobutene-substituted succinic anhydride of Example 1, 101 grams of the above diisobutenyl-substituted ethylene amine and 411 grams of mineral oil is heated at 150°–160° C. while being purged with nitrogen until no more water distills. The residue has a nitrogen content of 1.98%.

Example 23

A mixture of 45 grams of di-(polypropoxy)cocoamine having a molecular weight of 2265, 22 grams of polyisobutene-substituted succinic anhydride of Example 1 and 44 grams of mineral oil is heated at 150°–155° C. for 7 hours. The residue is found to have a nitrogen content of 0.25%.

Example 24

A mixture of 1,000 grams of the polyisobutene-substituted succinic anhydride of Example 1, 159 grams of menthane diamine and 500 grams of mineral oil is prepared at 70°–100° C. and heated at 150°–190° C. while being blown with nitrogen until no water distills. The residue is diluted with 258 grams of mineral oil and the solution is found to have a nitrogen content of 1.32.

The complex-forming metal reactants useful in preparing the metal complexes of this invention include the nitrates, nitrites, halides, carboxylates, phosphates, phosphites, sulfates, sulfites, carbonates, borates, and oxides of cadmium and tin as well as metals having atomic numbers from 24 to 30 (including chromium, manganese, iron, cobalt, nickel, copper and zinc). These metals are the so-called transition or co-ordination metals, i.e., they are capable of forming complexes by means of their secondary or co-ordination valence. Specific examples of the complex-forming metal compounds useful as the reactant in this invention are cobaltous nitrate, cobaltous oxide, cobaltic oxide, cobalt nitrite, cobaltic phosphate, cobaltous chloride, cobaltic chloride, cobaltous carbonate, chromous acetate, chromic acetate, chromic bromide, chromous chloride, chromic fluoride, chromous oxide, chromium dioxide, chromic oxide, chromic sulfite, chromous sulfate heptahydrate, chromic sulfate, chromic formate, chromic hexanoate, chromium oxychloride, chromic phosphite, manganous acetate, manganous benzoate, manganous carbonate, manganese dichloride, manganese trichloride, manganous citrate, manganous formate, manganous nitrate, manganous oxalate, manganese monoxide, manganese dioxide, manganese trioxide, manganese heptoxide, manganic phosphate, manganous pyrophosphate, manganic metaphosphate, manganous hypophosphite, manganous valerate, ferrous acetate, ferric benzoate, ferrous bromide, ferrous carbonate, ferric formate, ferrous lactate, ferrous nitrate, ferrous oxide, ferric oxide, ferric hypophosphite, ferric sulfate, ferrous sulfiite, ferric hydrosulfite, nickel dibromide, nickel dichloride, nickel nitrate, nickel dioleate, nickel stearate, nickel sulfite, cupric propionate, cupric acetate, cupric metaborate, cupric benzoate, cupric formate, cupric laurate, cupric nitrite, cupric oxychloride, cupric palmitate, cupric salicylate, zinc benzoate, zinc borate, zinc bromide, zinc chromate, zinc dichromate, zinc iodide, zinc lactate, zinc nitrate, zinc oxide, zinc stearate, zinc sulfite, stannous chloride, stannous fluoride, cadmium benzoate, cadmium carbonate, cadmium butyrate, cadmium chloroacetate, cadmium fumerate, cadmium nitrate, cadmium di-hydrogenphosphate, cadmium sulfite, and cadmium oxide. Hydrates of the above compounds are especially convenient for use in the process of this invention.

The reaction by which the metal complexes of this invention are formed from the non-acidic, acylated nitrogen intermediate and the complex-forming metal reactants may be effected simply by mixing the reactants at the desired temperature. It is preferably carried out at a temperature of at least about 80° C. In some instances the reaction temperature may be as low as room temperature such as 25° C. The upper limit for the reaction temperature is the decomposition point of the reaction mixture although a temperature higher than 250° C. is rarely necessary.

Inasmuch as the metal reactant is often a solid, the reaction is preferably carried out in the presence of a diluent or solvent in which the reactants are soluble or the product is soluble. The solvent may be any fluid, inert solvent such as benzene, xylene, toluene, kerosene, mineral oil, chlorobenzene, dioxane or the like.

The relative amounts of the acylated nitrogen intermediate and the complex forming metal reactant may vary within wide ranges. Usually at least about 0.1 equivalent of the metal reactant is used per equivalent of the acylated nitrogen intermediate (based upon its nitrogen content). The preferred amount of the metal reactant is from about 0.3 to 2 equivalents per nitrogen equivalent of the acylated nitrogen intermediate. The equivalent weight of the metal reactant is based on the number of the metal radicals in its molecule. Thus, the equivalent weight of cobaltic chloride is its molecular weight and the equivalent weight of zinc phosphate is one-third its molecular weight. Also, the relative amount of the metal reactant is based to some extent upon the co-ordination number of the metal of the complex-forming metal reactant. For instance, as many as six nitrogen equivalents of the acylated nitrogen intermediate may combine with one equivalent of a metal reactant in which the metal has a co-ordination number of six.

The product obtained by the reaction of the non-acidic, acylated nitrogen intermediate and the metal reactant is a "metal complex," that is, it results from the combination of the nitrogen radicals of the acylated nitrogen intermediate and the metal of the metal reactant by means of the secondary valence of the metal. The precise nature of the metal complex is not known. It is known however that the chemical linkage which characterizes such complex is a stable linkage. It has also been found that an acylated nitrogen intermediate prepared from an excess of the alkylene amine (i.e., more than one equivalent of the alkylene amine per equivalent of the hydrocarbon-substituted succinic acid), is capable of forming metal complexes with a large amount of the metal reactant and that the metal complexes so formed are especially effective for the purposes of this invention. Consequently, it is preferred in the process for preparing the metal complexes of this invention to use the acylated nitrogen intermediate derived from an excess of alkylene amines.

The following examples illustrate the metal complexes of this invention.

Example I

A non-acidic, acylated nitrogen intermediate is prepared by heating a mixture of 205 grams (5 equivalents) of a commercial alkylene amine mixture consisting of mixtures of ethylene diamine and higher homologues thereof and having an average composition corresponding to that of tetraethylene pentamine, 810 grams of mineral oil, 1500 milliliters of benzene, and 1,028 grams (2 equivalents) of a polyisobutene-substituted succinic anhydride having an acid number of 109 (prepared by the reaction of a chlorinated polyisobutene having an average molecular weight of 1,000 and a chlorine content of 4.3% and 20% molar excess of maleic anhydride) at 90°–95° C. for 5 hours, whereupon water is removed as the distillate. The residue is heated to 95° C./5 mm. and is found to have a nitrogen content of 3.2%. To 257 grams (0.6 equivalent of nitrogen) of this oil solution of the acylated nitrogen intermediate and 150 grams of dioxane there is added 30 grams (0.125 equivalent) of nickel nitrate hexahydrate ($Ni(NO_3)_2 \cdot 6H_2O$). The mixture is heated at 91°–93° C. for 18.5 hours, filtered, heated to 130°/18 mm. and filtered again. The filtrate is a 38% oil solution of the metal complex having a nickel content of 1.6% and a nitrogen content of 3.8%.

Example II

A non-acidic, acylated nitrogen intermediate is prepared by reacting 2,076 grams (4 equivalents) of the polyisobutene-substituted succinic anhydride of Example I and 292 grams (8 equivalents) of triethylene tetramine in 1,555 grams of mineral oil at 215° C. for 12 hours whereupon water, 38 grams, is removed as the distillate.

The residue is filtered. The filtrate is a 40% oil solution of the intermediate having a nitrogen content of 2.4% and an acid number of 1.3 (phenolphthalein indicator). To 1,300 grams (2.3 equivalents of nitrogen) of the above oil solution of the intermediate there is added 476 grams (2 equivalents) of nickel dichloride hexahydrate. The mixture is heated at 120° C. for 9 hours, diluted with a large excess of benzene and filtered. The filtrate is heated to 86° C./10 mm. and again filtered. This filtrate is a 35% oil solution of the metal complex having a nickel content of 3%, a chlorine content of 4.6% and a nitrogen content of 2.1%.

*Example III*

To 419 grams (0.75 equivalent of nitrogen) of the oil solution of the non-acidic, acylated nitrogen intermediate of Example II there is added at 140°–150° C. within a period of 6 hours, 324 grams (1.1 equivalents) of cupric benzoate. The mixture is heated at 140°–150° C. for 3 hours and filtered. The residue is heated to 65° C./35 mm. and again filtered. The filtrate is a 40% oil solution of the metal complex having a copper content of 0.2% and a nitrogen content of 2%.

*Example IV*

A mixture of 485 grams of the oil solution of the non-acidic, acylated nitrogen intermediate of Example II and 74 grams of zinc dihydrogen phosphate dihydrate and 51 grams of mineral oil is heated at 160° C. for 14.5 hours, mixed with 250 cc. of xylene and filtered. The filtrate is heated to 130° C./15 mm. and again filtered. This filtrate is a 40% oil solution of the metal complex having a zinc content of 2.6%, a phosphorus content of 2.5% and a nitrogen content of 2.1%.

*Example V*

A metal complex is obtained by heating 972 grams of the non-acidic, acylated nitrogen intermediate of Example II, 68 grams of zinc dichloride, and 45 grams of mineral oil at 145° C. for 21 hours. The resulting mixture is diluted with a large excess of toluene and filtered. The filtrate is heated to 130° C./15 mm. and again filtered. This filtrate is a 40% oil solution of the metal complex having a zinc content of 2.8%, a chlorine content of 2.9% and a nitrogen content of 2.1%.

*Example VI*

A non-acidic, acylated nitrogen intermediate is obtained by heating 4,392 grams of the polyisobutene-substituted succinic anhydride of Example I, 540 grams of an alkylene mixture of 3 parts (by weight) of triethylene tetramine and 1 part of diethylene triamine, and 3,240 grams of mineral oil at 130°–240° C. in 3.5 hours and filtered. The product has a nitrogen content of 2.2%. To 2,025 grams of the above filtrate and 535 grams of mineral oil there is added 238 grams (0.32 equivalent per equivalent of nitrogen of the intermediate) of nickel dichloride hexahydrate. The resulting mixture is heated at 160° C. for 24 hours whereupon water (101 grams) is removed as the distillate. The residue is diluted with xylene and filtered and the filtrate is heated to 118° C./5 mm. and filtered again. The latter filtrate is a 50% oil solution of the metal complex having a nickel content of 1.6%, a chlorine content of 2.3% and a nitrogen content of 1.6%.

*Example VII*

A mixture of 63 grams of mineral oil, 250 grams of xylene, 109 grams of cupric phosphate trihydrate, and 507 grams of the acylated nitrogen intermediate of Example VI is heated at 165° C. for 18 hours and filtered. The filtrate is heated to 120° C./5 mm. and again filtered. This filtrate is a 40% solution of the metal complex having a copper content of 1.7%, a phosphorus content of 1% and a nitrogen content of 2.2%.

*Example VIII*

A metal complex is obtained by heating 50 grams of copper diacetate monohydrate, 283 grams of mineral oil, 507 grams of the non-acidic, acylated nitrogen intermediate of Example VI and 250 milliliters of xylene at 160° C. for 32 hours. The reaction mixture is then filtered and the filtrate is heated to 110° C./5 mm. and filtered again. This filtrate is a 59% oil solution of the metal complex having a copper content of 0.3% and a nitrogen content of 1.2%.

*Example IX*

A metal complex is prepared by heating a mixture of 133 grams of mineral oil, 250 milliliters of xylene, 50 grams of ferrous chloride tetrahydrate, and 507 grams of the non-acidic, acylated nitrogen intermediate of Example VI at 160° C. for 15 hours whereupon water, 17.3 grams, is removed as the distillate. The reaction mixture is then filtered and the filtrate is heated to 140° C./5 mm. and filtered again. This filtrate is a 50% oil solution of the metal complex having an iron content of 1.7%, a chlorine content of 2.4% and a nitrogen content of 1.6%.

*Example X*

A metal complex is prepared by heating a mixture of 142 grams of mineral oil, 250 milliliters of xylene, 43 grams of cupric chloride dihydrate, and 485 grams of the non-acidic, acylated nitrogen intermediate of Example II, at 160° C. for 20 hours. The reaction mixture is then filtered and the filtrate is heated to 120° C./5 mm. and filtered again. This filtrate is a 50% oil solution of the metal complex having a copper content of 1.7%, a chlorine content of 2.1% and a nitrogen content of 1.4%.

*Example XI*

A metal complex is prepared by heating a mixture of 142 grams of mineral oil, 250 milliliters of xylene, 47 grams of ferrous sulfate dihydrate, and 487 grams of the non-acidic, acylated nitrogen intermediate of Example II at 150° C. for 22 hours. The reaction mixture is then filtered and the filtrate is heated to 100° C./8 mm. and filtered again. This filtrate is a 50% oil solution of the metal complex having an iron content of 2.4%, a nitrogen content of 1.5%, and a sulfur content of 0.7%.

*Example XII*

A metal complex is prepared by heating a mixture of 147 grams of mineral oil, 200 grams of water, 50 grams of chromic oxide and 487 grams of the non-acidic, acylated nitrogen intermediate of Example II at 96° C. for 5 hours and then blowing the reaction mixture with nitrogen at 170° C. The resulting mixture is filtered. The filtrate is a 50% oil solution of the metal complex having a chromium content of 3.9% and a nitrogen content of 1.9%.

*Example XIII*

A mixture of 487 grams of the non-acidic, acylated nitrogen intermediate of Example II, 46 grams of cadmium dichloride, 143 grams of mineral oil is heated at 140° C. for 6 hours. Water, 200 grams, is then added to the reaction mixture and the resulting mixture is heated at 85°–90° C. for 6 hours and then blown with nitrogen at 160° C. for 5 hours. The mixture is filtered. The filtrate is heated to 145° C./26 mm. and filtered again. This filtrate is a 50% oil solution of the metal complex having a cadmium content of 3.9%, a chlorine content of 2.5% and a nitrogen content of 1.8%.

*Example XIV*

A metal complex is prepared by heating a mixture of 137 grams of mineral oil, 200 milliliters of xylene, 200 grams of water, 32 grams of cadmium oxide and 507 grams of the non-acidic, acylated nitrogen intermediate of Example VI at 96°–165° C. for 7 hours. The residue is heated to 115° C./5 mm. and filtered. The filtrate is a 50% oil solution of the metal complex having a cadmium content of 1.1% and a nitrogen content of 1.7%.

Example XV

A metal complex is obtained by heating a mixture of 150 grams of mineral oil, 250 milliliters of xylene, 48 grams of stannous chloride and 512 grams of the non-acidic, acylated nitrogen intermediate of Example VI at the reflux temperature for 16 hours. The reaction mixture is then filtered. The filtrate is heated to 120° C./10 mm. and again filtered. This filtrate is a 50% oil solution of the metal complex having a tin content of 3.1%, a chlorine content of 1.8% and a nitrogen content of 1.5%.

Example XVI

A metal complex is obtained by heating a mixture of 400 grams of mineral oil, 370 grams of n-hexanol, 238 grams of cobalt dichloride hexahydrate, and 978 grams of the non-acidic, acylated nitrogen intermediate of Example II at the reflux temperature for 29 hours. The mixture is filtered and the filtrate is heated to 120° C./10 mm. and again filtered. This filtrate is a 53% oil solution of the metal complex having a cobalt content of 3.6%, a chlorine content of 4.3% and a nitrogen content of 1.7%.

Example XVII

A metal complex is obtained by heating 250 grams of n-hexanol, 72 grams of cobaltous nitrate hexahydrate and 485 grams of the non-acidic, acylated nitrogen intermediate of Example II at 145°–160° C. for 25 hours. The reaction mixture is filtered and the filtrate is heated to 160° C./20 mm. and filtered again. This filtrate is a 37% oil solution of the metal complex having a cobalt content of 2.4%, and a nitrogen content of 2.9%.

Example XVIII

A metal complex is prepared by heating a mixture of 512 grams of the non-acidic, acylated nitrogen intermediate of Example VI, 96 grams of zinc borate

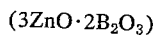

(3ZnO·2B$_2$O$_3$)

198 grams of mineral oil, and 250 milliliters of xylene at 134°–155° C. for 15 hours. To this mixture there is added 250 grams of water and the resulting mixture is heated at the reflux temperature for 18 hours and then to 165° C. The residue is filtered and the filtrate is heated to 115° C./6 mm. and again filtered. The latter filtrate has a zinc content of 0.7%, a boron content of 7.4% and a nitrogen content of 1.3%.

Example XIX

A mixture of 280 grams of xylene, 50 grams of stannous fluoride and 755 grams of the oil solution of the non-acidic, acylated nitrogen intermediate of Example II is heated at the reflux temperature (160° C.) for 5 hours and then is heated to 220° C. while xylene is being distilled off. The residue is then heated at 220°–225° C. for 2 hours and filtered. The filtrate is heated to 150° C./5 mm. and again filtered at 140° C. The latter filtrate is an oil solution of the metal complex having a tin content of 1.8% and a nitrogen content of 2.1%.

Example XX

A metal complex is obtained by the procedure of Example II except that manganese dichloride (4 equivalents) is used in place of the nickel dichloride hexahydrate.

Example XXI

A polyisobutene-substituted succinic anhydride is prepared by the reaction of a chlorinated polypropylene having a molecular weight of 900 and a chlorine content of 4% and maleic anhydride at 200° C. The product has an acid number of 75. To a mixture of 390 grams (0.52 equivalent) of this anhydride 500 grams of toluene and 170 grams of mineral oil there is added 44 grams of tetraethylene pentamine. The reaction mixture is heated at the reflux temperature for 3 hours and water is removed by azeotropic distillation. Toluene is then removed by heating the reaction mixture of 150° C./20 mm. The residue is an oil solution of the non-acidic, acylated nitrogen intermediate. A metal complex is then obtained from this intermediate and copper dibenzoate according to the procedure of Example III.

Example XXII

A metal complex is obtained by the procedure of Example II except that the polyisobutene-substituted succinic anhydride is replaced by an isobutene-styrene copolymer (having weight ratio of 95:5, respectively, and a molecular weight of 1200)-substituted succinic anhydride.

Example XXIII

A metal complex is obtained by the procedure of Example V except that the non-acidic, acylated nitrogen intermediate is prepared by the reaction of 2 equivalents of diethylene triamine with 1 equivalent of a polyisobutene (molecular weight of 100,000)-substituted succinic anhydride.

Example XXIV

A metal complex is obtained by heating a mixture of 357 grams of cobaltous chloride hexahydrate, 2800 grams of a non-acidic, acylated nitrogen intermediate having a nitrogen content of 1.5% and prepared by the procedure of Example 7, and 250 grams of xylene at the reflux temperature whereupon 148 grams of water is removed by azeotropic distillation. The residue is heated for two hours, mixed with 560 grams of mineral oil and filtered. The filtrate is heated to distill off xylene and again filtered. The latter filtrate is a 50% oil solution of the metal complex having a cobalt content of 1.2%.

The metal complexes of this invention are useful for a wide variety of purposes. For instance, they are useful as emulsifying agents, detergents, paint additives, rubber additives, plasticizers, anti-wear agents, etc. A principal utility of such metal complexes is as additives in lubricants. It has been discovered in accordance with this invention that when used as lubricant additives the metal complexes depend, for their effectiveness, to a large extent upon the size of the hydrocarbon substituent in the succinic radical of the acylated nitrogen intermediate from which the complexes are derived. More particularly, it has been found that the metal complexes in which the hydrocarbon substituent contains more than about 50 aliphatic carbon atoms are effective to impart detergent properties to lubricants. It has also been found that the detergent properties of the metal complexes diminish with a decrease in the size of the hydrocarbon substituent having less than about 50 aliphatic carbon atoms so that complexes having less than 35 aliphatic carbon atoms in this substituent are not useful for the purposes of this invention. The presence of the metal constituent in the metal complexes likewise is essential to the effectiveness of the complexes as lubricant additives. More particularly, the metal constituent has been found to impart corrosion-inhibiting and oxidation-inhibiting characteristics to the metal complexes.

The lubricating oils in which the metal complexes of this invention are useful as additives may be of synthetic, animal, vegetable, or mineral origin. Ordinarily mineral lubricating oils are preferred by reason of their availability, general excellence, and low cost. For certain applications, oils belonging to one of the other three groups may be preferred. For instance, synthetic polyester oils such as didodecyl adipate and di-2-ethylhexyl sebacate are often preferred as jet engine lubricants. Normally the lubricating oils preferred will be fluid oils, ranging in viscosity from about 40 Saybolt Universal seconds at 100° F. to about 200 Saybolt Universal seconds at 210° F.

The concentration of the metal complexes as additives in lubricants usually ranges from about 0.01% to about 10% by weight. The optimum concentrations for a particular application depend to a large measure upon the type of service to which the lubricant is to be subjected. Thus, for example, lubricants for use in gasoline internal combustion engines may contain from about 0.5 to about 5% of the additive, whereas lubricating compositions for use in gears and diesel engines may contain as much as 10% or even more of the additive.

This invention contemplates also the presence of other additives in the lubricating compositions. Such additives include, for example, supplemental detergents of the ash-containing type, viscosity index improving agents, pour point depressing agents, anti-foam agents, extreme pressure agents, rust-inhibiting agents, and supplemental oxidation and corrosion-inhibiting agents.

The ash-containing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium, and barium.

The term "basic salt" is used to designate the metal salts wherein the metal is present in stoichiometrically larger amounts than the organic acid radical. The commonly employed methods for preparing the basic salts involves heating a mineral oil solution of an acid with a stoichiometric excess of a metal neutralizing agent such as the metal oxide, hydroxide, carbonate, bicarbonate, or sulfide at a temperature about 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, Cellosolve, Carbitol, ethylene glycol, stearyl alcohol, and cyclohexyl alcohol; amines such as aniline, phenylenediamine, phenothiazine, phenyl beta-naphthylamine, and dodecylamine. A particularly effective method for preparing the basic salts comprises mixing an acid with an excess of a basic alkaline earth metal neutralizing agent, a phenolic promoter compound, and a small amount of water and carbonating the mixture at an elevated temperature such as 60°–200° C.

The preparation of a basic sulfonate detergent is illustrated as follows: A mixture of 490 parts (by weight) of a mineral oil, 110 parts of water, 61 parts of heptylphenol, 340 parts of barium mahogany sulfonate, and 227 parts of barium oxide is heated at 100° C. for 0.5 hour and then to 150° C. Carbon dioxide is then bubbled into the mixture until the mixture is substantially neutral. The mixture is filtered and the filtrate found to have a sulfate ash content of 25%.

The preparation of a basic barium salt of a phosphorus acid is illustrated as follows: A polyisobutene having a molecular weight of 50,000 is mixed with 10% by weight of phosphorus pentasulfide at 200° C. for 6 hours. The resulting product is hydrolyzed by treatment with steam at 160° C. to produce an acidic intermediate. The acidic intermediate is then converted to a basic salt by mixing twice its volume of mineral oil, 2 moles of barium hydroxide and 0.7 mole of phenol and carbonating the mixture at 150° C. to produce a fluid product.

The metal complexes are especially adapted for use in combination with extreme pressure and corrosion-inhibiting additives such as metal dithiocarbamates, xanthates, the Group II metal phosphorodithioates and their epoxide adducts, hindered phenols, sulfurized cycloalkanes, di-alkyl polysulfides, sulfurized fatty esters, phosphosulfurized fatty esters, alkaline earth metal salts of alkylated phenols, dialkyl phosphites, triaryl phosphites, and esters of phosphorodithioic acids. Combinations of the substituted polyamines of this invention with any of the above-mentioned additives are especially desirable for use in lubricants which must have superior extreme pressure and oxidation-inhibiting characteristics.

The Group II metal phosphorodithioates are the salts of acids having the formula

in which $R_1$ and $R_2$ are substantially hydrocarbon radicals. The metals for forming such salts are exemplified by barium, calcium, strontium, zinc, and cadmium. The barium and zinc phosphorodithioates are especially preferred. The substantially hydrocarbon radicals in the phosphorodithioic acid are preferably low or medium molecular weight alkyl radicals and alkylphenyl radicals, i.e., those having from about 1 to about 30 carbon atoms in the alkyl group. Illustrative alkyl radicals include methyl, ethyl, isopropyl, isobutyl, n-butyl, sec-butyl, the various amyl alcohols, n-hexyl, methylisobutyl carbinyl, heptyl, 2-ethylhexyl, diisobutyl, isooctyl, nonyl, behenyl, decyl, etc. Illustrative lower alkylphenyl radicals include butylphenyl, amylphenyl, di-amylphenyl, octylphenyl, etc. Cycloalkyl radicals likewise are useful and these include chiefly cyclohexyl and the lower alkylcyclohexyl radicals. Other substantially hydrocarbon radicals likewise are useful such as tetradecyl, octadecyl, eicosyl, butylnaphthyl, hexylnaphthyl, octylnaphthyl, cyclohexylphenyl, naphthenyl, etc. Many substituted hydrocarbon radicals may also be used, e.g., chloropentyl, dichlorophenyl, and dichlorodecyl.

The availability of the phosphorodithioic acids from which the Group II metal salts of this invention are prepared is well known. They are prepared by the reaction of phosphorus pentasulfide with an alcohol or phenol. The reaction involves four moles of the alcohol or phenol per mole of phosphorus pentasulfide, and may be carried out within the temperature range from about 50° C. to about 200° C. Thus the preparation of O,O-di-n-hexyl phosphorodithioic acid involves the reaction of phosphorus pentasulfide with four moles of n-hexyl alcohol at about 100° C. for about 2 hours. Hydrogen sulfide is liberated and the residue is the defined acid. The preparation of the zinc or barium salt of this acid may be effected by reaction with zinc oxide or barium oxide. Simply mixing and heating these two reactants is sufficient to cause the reaction to take place and the resulting product is sufficiently pure for the purposes of this invention.

Especially useful Group II metal phosphorodithioates can be prepared from phosphorodithioic acids which in turn are prepared by the reaction of phosphorus pentasulfide with mixtures of alcohols. The use of such mixtures enables the utilization of cheaper alcohols which in themselves do not yield oil-soluble phosphorodithioic acids. Thus a mixture of isopropyl and hexyl alcohols can be used to produce a very effective, oil-soluble metal phosphorodithioate. For the same reason mixtures of simple phosphorodithioic (i.e., acids prepared from one alcohol) acids can be reacted with zinc oxide or barium oxide to produce less expensive, oil-soluble salts.

Another class of the phosphorothioate additives contemplated for use in the lubricating compositions of this invention comprises the adducts of the metal phosphorodithioates described above with an epoxide. The metal phosphorodithioates useful in preparing such adducts are for the most part the zinc phosphorodithioates. The epoxides may be alkylene oxides or arylalkylene oxides. The arylalkylene oxides are exemplified by styrene oxide, p- ethylstyrene oxide, alpha-methylstyrene oxide, 3-beta-naphthyl-1,3-butylene oxide, m-dodecylstyrene oxide, and p-chlorostyrene oxide. The alkylene oxides include principally the lower alkylene oxides in which the alkylene radical contains 6 or less carbon atoms. Examples of such lower alkylene oxides are ethylene oxide, propylene oxide, 1,2-butene oxide, trimethylene oxide, tetramethylene oxide, butadiene monoepoxide, 1,2-hexene oxide, and propylene epichlorohydrin. Other epoxides useful herein include, for example, butyl 9, 10-epoxy-stearate, epoxidized soya bean oil, epoxidized tung oil, and epoxidized copolymer of styrene with butadiene.

The adduct may be obtained by simply mixing the phosphorodithioate and the epoxide. The reaction is usually exothermic and may be carried out within wide temperature limits from about 0° C. to about 200° C. Because the reaction is exothermic it is best carried out by adding one reactant, usually the epoxide, in small increments to the other reactant in order to obtain convenient control of the temperature of the reaction. The reaction may be carried out in a solvent such as benzene, mineral oil, naphtha, or n-hexane.

The chemical structure of the adduct is not known. More than one mole, sometimes as many as four moles, of the epoxide can be made to combine with the phosphorodithioate to form products useful herein. However, adducts obtained by the reaction of one mole of the phosphorodithioate with from about 0.25 mole to about 1 mole of a lower alkylene oxide, particularly ethylene oxide and propylene oxide, have been found to be especially useful and therefore are preferred.

The lubricating compositions may contain metal detergent additives in amounts usually within the range of about 0.1% to about 20% by weight. In some applications such as in lubricating marine diesel engines the lubricating compositions may contain as much as 30% of a metal detergent additive. They may contain extreme pressure addition agents, viscosity index improving agents, and pour point depressing agents, each in amounts within the range from about 0.1% to about 10%.

The following examples are illustrative of the lubricating compositions of this invention: (all percentages are by weight).

Example A

SAE 20 mineral lubricating oil containing 0.5% of the product of Example I.

Example B

SAE 30 mineral lubricating oil containing 0.75% of the product of Example II and 0.1% of phosphorus as the barium salt of di-n-nonylphosphorodithioic acid.

Example C

SAE 10W–30 mineral lubricating oil containing 0.4% of the product of Example III.

Example D

SAE 90 mineral lubricating oil containing 0.1% of the product of Example IV and 0.15% of the zinc salt of an equimolar mixture of di-cyclohexylphosphorodithioic acid and di-isobutyl phosphorodithioic acid.

Example E

SAE 30 mineral lubricating oil containing 2% of the product of Example V.

Example F

SAE 20W–30 mineral lubricating oil containing 5% of the product of Example XX.

Example G

SAE 10W–30 mineral lubricating oil containing 1.5% of the product of Example II and 0.05% of phosphorus as the zinc salt of a phosphorodithioic acid prepared by the reaction of phosphorus pentasulfide with a mixture of 60% (mole) of p-butylphenol and 40% (mole) of n-pentyl alcohol.

Example H

SAE 50 mineral lubricating oil containing 3% of the product of Example XXII and 0.1% of phosphorus as the calcium salt of di-hexylphosphorodithioate.

Example I

SAE 10W–30 mineral lubricating oil containing 2% or the product of Example II, 0.06% of phosphorus as zinc di-n-octylphosphorodithioate, and 1% of sulfate ash as barium mahogany sulfonate.

Example J

SAE 30 mineral lubricating oil containing 5% of the product of Example X, 0.1% of phosphorus as the zinc salt of a mixture of equimolar amounts of di-isopropylphosphorodithioic acid and di-n-decylphosphorodithioic acid, and 2.5% of sulfate ash as a basic barium detergent prepared by carbonating at 150° C. a mixture comprising mineral oil, barium di-dodecylbenzene sulfonate and 1.5 moles of barium hydroxide in the presence of a small amount of water and 0.7 mole of octylphenol as the promoter.

Example K

SAE 10W–30 mineral lubricating oil containing 6% of the product of Example XVII, 0.075% of phosphorus as zinc di-n-octylphosphorodithioate, and 5% of the barium salt of an acidic composition prepared by the reaction of 1000 parts of a polyisobutene having a molecular weight of 60,000 with 100 parts of phosphorus pentasulfide at 200° C. and hydrolyzing the product with steam at 150° C.

Example L

SAE 10 mineral lubricating oil containing 2% of the product of Example XIX, 0.075% of phosphorus as the adduct of zinc di-cyclohexylphosphorodithioate treated with 0.3 mole of ethylene oxide, 2% of a sulfurized sperm oil having a sulfur content of 10%, 3.5% of a poly-(alkyl methacrylate) viscosity index improver, 0.02% of a poly-(alkyl methacrylate) pour point depressant, 0.003% of a poly-(alkyl siloxane) anti-foam agent.

Example M

SAE 10 mineral lubricating oil containing 1.5% of the product of Example VII, 0.075% of phosphorus as the adduct obtained by heating zinc di-nonylphosphorodithioate with 0.25 mole of 1,2-hexene oxide at 120° C., a sulfurized methyl ester of tall oil acid having a sulfur content of 15%, 6% of a poly-butene viscosity index improver, 0.005% of a poly-(alkyl methacrylate) anti-foam agent, and 0.5% of lard oil.

Example N

SAE 20 mineral lubricating oil containing 1.5% of the product of Example II, 0.5% of di-dodecyl phosphite, 2% of the sulfurized sperm oil having a sulfur content of 9%, a basic calcium detergent prepared by carbonating a mixture comprising mineral oil, calcium mahogany sulfonate and 6 moles of calcium hydroxide in the presence of an equi-molar mixture (10% of the mixture) of methyl alcohol and n-butyl alcohol as the promoter at the reflux temperature.

Example O

SAE 10 mineral lubricating oil containing 25% of the product of Example VI, 0.07% of phosphorus as zinc di-octylphosphorodithioate, 2% of a barium detergent prepared by neutralizing with barium hydroxide the hydrolyzed reaction product of a polypropylene (molecular weight 2000) with 1 mole of phosphorus pentasulfide and 1 mole of sulfur, 3% of a barium sulfonate detergent prepared by carbonating a mineral oil solution of mahogany acid, and a 500% stoichiometrically excess amount of barium hydroxide in the presence of phenol as the promoter at 180° C., 3% of a supplemental ashless detergent prepared by copolymerizing a mixture of 95% (weight) of decyl-methacrylate and 5% (weight) of diethylaminoethylacrylate.

*Example P*

SAE 80 mineral lubricating oil containing 2% of the product of Example XIX, 0.1% of phosphorus as zinc di-n-hexylphosphorodithioate, 10% of a chlorinated paraffin wax having a chlorine content of 40%, 2% of dibutyl tetrasulfide, 2% of sulfurized dipentene, 0.2% of oleyl amide, 0.003% of an anti-foam agent, 0.02% of a pour point depressant, and 3% of a viscosity index improver.

*Example Q*

SAE 10 mineral lubricating oil containing 3% of the product of Example VI, 0.075% of phosphorus as the zinc salt of a phosphorodithioic acid prepared by the reaction of phosphorus pentasulfide with an equimolar mixture of n-butyl alcohol and dodecyl alcohol, 3% of a barium detergent prepared by carbonating a mineral oil solution containing 1 mole of sperm oil, 0.6 mole of octylphenol, 2 moles of barium oxide, and a small amount of water at 150° C.

*Example R*

SAE 20 mineral lubricating oil containing 2% of the product of Example II and 0.07% of phosphorus as zinc di-n-octylphosphorodithioate.

*Example S*

SAE 30 mineral lubricating oil containing 3% of the product of Example XV and 0.1% of phosphorus as zinc di-(isobutylphenyl)-phosphorodithioate.

*Example T*

SAE 50 mineral lubricating oil containing 2% of the product of Example XVII.

*Example U*

SAE 90 mineral lubricating oil containing 3% of the product of Example II and 0.2% of phosphorus as the reaction product of 4 moles of turpentine with 1 mole of phosphorus pentasulfide.

*Example V*

SAE 90 mineral lubricating oil containing 3% of the product of Example I and 0.2% of 4,4'-methylene-bis-(2,6-di-tert-butylphenol).

*Example W*

SAE 30 mineral lubricating oil containing 2% of the product of Example III and 0.1% of phosphorus as phenylethyl di-cyclohexylphosphorodithioate.

The corrosion inhibiting properties of the metal complexes of this invention is shown by the results of the Co-ordinating Research Council (CRC) engine test No. L-38. This test, which employs a single cylinder spark ignition engine available from the Laboratory Equipment Corporation of Mooresville, Indiana, involves running the engine under constant speed, constant air-fuel ratio, and constant fuel flow conditions for a total of 40 hours subsequent to a break-in period of 4.5 hours. Prior to each test run the engine is thoroughly cleaned, pertinent measurements of engine parts are taken, and a complete set of new piston rings and new copper-lead connecting rod test bearing inserts are installed. The weight loss of the copper-load test bearings after completion of the engine test is an indication of the relative corrosiveness of the lubricants tested. By this test a lubricant consisting of SAE 30 mineral lubricating oil containing 3.05% (by weight) of the product of the metal complex of Example XIX and containing 0.003% of a dialkyl silicone anti-foam agent and 0.79% of zinc dialkyl phosphorodithioate in which the alkyl radicals consist of 65 mole percent of isobutyl radical and 35 mole percent of primary-pentyl radicals is found to result in a bearing weight loss of 53.9 milligrams.

The effectiveness of the metal complexes of this invention as detergent additives in lubricants is shown by the result of the following modified CRC-EX-3 engine test (the modification consisting of extending the test period from the specified 96 hours to 144 hours, thus making the test more severe). This test is recognized in the field as an important test by which lubricants can be evaluated for use under relatively light duty or intermittently high and low temperature service conditions such as are encountered in the operation of automobiles in urban use. In this test, the lubricant is used in the crankcase of a 1954 6-cylinder Chevrolet Powerglide engine operated for 144 hours under recurring cyclic conditions, each cycle consisting of: 2 hours at engine speed of 500 r.p.m. under no load, oil sump temperature of 100°–125° F., and air fuel ratio of 10:1; and 2 hours at an engine speed of 2500 r.p.m. under a load of 40 brake horsepower, oil sump temperature of 240°–280° F., and an air:fuel ratio of 16:1. At the end of the test, the lubricant is rated in terms of (1) the extent of piston filling, (2) the amount of sludge formed in the engine (rating scale of 80–0, 80 being indicative of no sludge and 0 being indicative of extremely heavy sludge, and (3) the total amount of engine deposits, i.e., sludge and varnish formed in the engine (rating scale of 100–0, 100 being indicative of no deposit and 0 being indicative of extremely heavy deposit. By this test a lubricant consisting of SAE 20 mineral lubricating oil containing 3.14% (by weight) of the metal complex prepared by the procedure of Example VI and also containing 0.003% of a dialkyl silicone anti-foam agent and 0.53% of zinc dialkyl phosphorodithioate in which the alkyl radicals consist of 65 mole percent of isobutyl radical and 35 mole percent of primary-pentyl radicals is found to give the following results: percent ring filling: 1%, sludge rating: 78.4 and total deposit rating: 97.2.

The effectiveness of the metal complexes of this invention as detergent additives is also shown by the results of the following Air Oxidation test. In this test a 350-cc. sample of a lubricant containing the additive to be tested is heated at 300° F., for 96 hours in a 2" x 15" borosilicate tube. The lubricant base employed in the test is a mid-continent conventionally refined mineral oil having a viscosity to about 200 Saybolt Universal seconds at 100° F. Air is bubbled through the lubricant at a rate of 10 liters per hour. The oxidized sample is allowed to cool to 122° F. and to stand for 15 hours at room temperature and then filtered through No. 1 Whatman paper (double thickness) under slightly reduced pressure. The sludge deposit formed during the test is collected on the filter paper, washed with naphtha to a constant weight and reported as milligrams of sludge per 100 cc. of oil. The smaller the amount of the sludge deposit the more effective the detergent additive. By this test the lubricant base gives 800–1200 milligrams of sludge deposit per 100 ml. of test sample whereas the base containing 1.5% (by weight) of the metal complex of Example XIX gives 5 milligrams of sludge deposits per ml. of the test sample.

What is claimed is:

1. A lubricating composition comprising a major proportion of a lubricating oil and a minor proportion of a metal complex prepared by the process comprising forming a non-acidic, acylated nitrogen intermediate by the reaction of 1 equivalent of a hydrocarbon-substituted succinic acid or anhydride having at least about 50 aliphatic carbon atoms in the hydrocarbon substituent with from about 1 equivalent to about 2 moles of an amine selected from the class consisting of alkylene amines, piperazines, and imidazolines and reacting said acylated nitrogen intermediate with from about 0.1 equivalent to about 2 equivalents per equivalent of the amine, of a complex-forming metal compound selected from the class consisting of nitrates, nitrites, halides, carboxylates, phosphates, phosphites, sulfates, sulfites, carbonates, borates, and oxides of cadmium, tin, and metals having atomic numbers from 24 to 30 at a temperature above about 25° C. and below the decomposition point of the reaction mixture.

2. The lubricant of claim 1 wherein the complex-forming metal compound is a metal halide.

3. The lubricant of claim 1 wherein the complex-forming metal compound is a zinc halide.

4. The lubricant of claim 1 wherein the complex-forming metal compound is a tin halide.

5. A lubricating composition comprising a major proportion of a lubricating oil and a minor proportion of a metal complex prepared by the process comprising forming a non-acidic, acylated nitrogen intermediate by the reaction 1 equivalent of an olefin polymer-substituted succinic acid or anhydride having at least about 50 aliphatic carbon atoms in the olefin polymer substituent with about 1 equivalent to about 2 moles of an ethylene amine and reacting said acylated nitrogen intermediate with from about 0.1 equivalent to about 2 equivalents per equivalent of the amine, of a complex-forming metal halide in which the metal has an atomic number from 24 to 30 at a temperature above about 25° C. and below the decomposition point of the reaction mixture.

6. The lubricant of claim 5 wherein the olefin polymer substituted succinic acid is an olefin polymer substituted succinic acid anhydride.

7. A lubricating composition comprising a major proportion of a lubricating oil and a minor proportion of a metal complex prepared by the process comprising forming a non-acidic, acylated nitrogen intermediate by the reaction of one equivalent of a polyisobutene-substituted succinic acid anhydride wherein the polyisobutene substituent has a molecular weight from about 700 to 5000 with from about 1.1 to 5 equivalents of a polyethylene polyamine and reacting said acylated nitrogen intermediate with from about 0.1 to 5 equivalents of a complex-forming metal halide in which the metal is selected from the class consisting of tin and metal having an atomic number from 24 to 30 at a temperature above about 25° C. and below the decomposition point of the reaction mixture.

8. The lubricating composition of claim 7 wherein the metal halide is zinc chloride.

9. The lubricating composition of claim 7 wherein the metal halide is stannous fluoride.

10. The lubricating composition of claim 7 wherein the metal halide is stannous chloride.

11. The lubricating composition of claim 7 wherein the polyethylene polyamine has from 2 to about 11 amino groups.

12. The lubricant of claim 1 wherein said amine is hydroxy-substituted amine.

References Cited

UNITED STATES PATENTS 3,163,603  12/1964  Le Suer _____ 252—33.6

DANIEL E. WYMAN, *Primary Examiner.*

P. P. GARVIN, *Assistant Examiner.*